United States Patent [19]

McManus et al.

[11] Patent Number: 4,788,647
[45] Date of Patent: Nov. 29, 1988

[54] CONTROL SYSTEM FOR ELECTRIC POWER PLANT

[75] Inventors: Kirby L. McManus, Redmond; Paul J. McManus, Seattle, both of Wash.

[73] Assignee: Digitek, Inc., Kenmore, Wash.

[21] Appl. No.: 911,488

[22] Filed: Sep. 24, 1986

[51] Int. Cl.[4] .............................................. H02J 13/00
[52] U.S. Cl. ............................... 364/494; 340/825.06; 364/492
[58] Field of Search ............... 364/200, 900, 492, 493, 364/494, 483, 188, 191, 578; 361/1, 332, 334, 382; 340/825.06; 60/646, 657, 660; 434/219

[56] References Cited

U.S. PATENT DOCUMENTS

| | | | |
|---|---|---|---|
| 4,096,699 | 6/1978 | Zitelli | 60/660 |
| 4,195,231 | 3/1980 | Reed et al. | 364/494 |
| 4,220,869 | 9/1980 | Uram | 364/494 |
| 4,280,060 | 7/1981 | Kure-Jensen et al. | 364/494 |
| 4,577,281 | 3/1986 | Bukowski et al. | 364/494 |
| 4,613,952 | 9/1986 | McClanahan | 434/219 |

OTHER PUBLICATIONS

Computer Design, Jul. 1975, "Turbine-Generator Power Systems Operate Under Direct Digital Control", pp. 50–54.
IEEE Trans. Ind Elect & Cont Instr., vol. IECI-26, No. 1 (Feb. 1979).
"Hydrogenerating Station . . . ", Tawa et al, pp. 6–11.
Control Engineering, Oct. 1970, "Minicomputer is the Brains Behind Electrohydraulic Control System . . . ", p. 56.
"Digitek Hydro-Scada: Automatic and Remote Control for Hydro Plants", Digitek, Inc., Kenmore, Wash. 98028, 4 pages.

Primary Examiner—Parshotam S. Lall
Assistant Examiner—Kevin J. Teska
Attorney, Agent, or Firm—Christensen, O'Connor, Johnson & Kindness

[57] ABSTRACT

An integrated control system for a power plant having a generator, a turbine, a gate for controlling flow through the turbine, a voltage regulator, a bus and a main circuit breaker. The control system comprises a nonvolatile memory for storing configuration data that includes a plurality of configuration parameters for the power plant. The control system further includes input devices for producing input data concerning current plant conditions including turbine speed, gate position, generator current and voltage, bus current and voltage, and the position of the main circuit breaker. A multitasking processor processes the input data in accordance with the configuration data, to produce control signals for controlling the power plant. An editing function is also provided to enable an operator to edit the configuration data, so that the control system can readily be configured for a particular power plant. The editing function may be provided by including a communication port through which the configuration data may be loaded to and from an external device on which the configuration data is edited.

2 Claims, 16 Drawing Sheets

| MODE | START RELAY | SYNC SWITCH | BREAKER POSITION | AUTO SWITCH |
|---|---|---|---|---|
| EMERGENCY STOP | OFF | X | OPEN | X |
| NORMAL STOP | OFF | X | CLOSED | X |
| ISOLATED | ON | OPEN | X | X |
| SYNCRONIZE | ON | CLOSED | OPEN | X |
| ONLINE | ON | CLOSED | CLOSED | OPEN |
| AUTO | ON | CLOSED | CLOSED | CLOSED |

CONTROL SYSTEM FOR ELECTRIC POWER PLANT

FIELD OF THE INVENTION

The present invention relates to electric power generating plants such as hydroelectric plants, and in particular to systems for controlling the operation of such plants.

BACKGROUND OF THE INVENTION

Control of a modern electric power plant is a complex process. At the most general level, such a plant comprises a generator coupled to a turbine or other source of mechanical power, a circuit breaker for connecting the generator to a bus, and a transformer for connecting the bus to a power grid. In a hydroelectric plant, a turbine converts the energy of moving water to rotation of the generator. The control system for an electric power plant must be capable of managing a large assembly of devices and instruments in real time. For example, the control system must regulate the generator field to regulate voltage or power, control the circuit breaker such that it opens and closes at appropriate times, and monitor and control all relevant turbine parameters such that the generator can produce the appropriate frequency output when the plant is being starting up or reconnected to the grid, or the appropriate energy level once the plant is connected to the grid.

In the past, the most typical approach to control systems for electric power plants has been to instal a large number of sensors, relays, and dedicated control systems for controlling particular aspects of plant operation. For example, in a hydroelectric plant, a control system will be provided for sensing turbine speed and generator voltage and for responsively regulating the water flow in accordance with predefined criteria. A typical power plant thus includes a large number of separate instruments, many of which were installed at different times and produced by different manufacturers. Typical instruments found in a present day power plant include transducers for voltage, amperage, VARs, watts, watt hours, frequency and power factor, meters for displaying measured values of all of the above parameters, relays for controlling the governor, the display of alarms, the start and stop functions, automatic synchronizing functions and so forth, plus a large number of protective relays scattered throughout the plant. Information is typically reported to an operator via an annunciator panel that consists of a grid of transparent displays that can be selectively illuminated. A traditional way of keeping records in a power plant is a log sheet, i.e., a clipboard that must be filled out with metering data at frequent intervals. Some power plants have chart recorders for stator and bearing temperatures, and separate chart recorders for automating the log sheet function.

In view of the above, it is clear that there is a need for an integrated control system for operating electric power plants. However development of such a control system is a difficult task. An integrated control system must be cost effective, must be reliable and fail-safe under all conditions, and must be readily adaptable to each particular power plant in which it is installed. Because virtually no two power plants are alike, it is this latter requirement in particular that has to date prevented the development of an effective, integrated power plant control system. In particular, although control systems for individual power plants have been designed and installed, such control systems in the past have been one of a kind adaptions to a particular power plant configuration.

SUMMARY OF THE INVENTION

The present invention provides an integrated control system for an electric power plant such as a hydroelectric generating plant. The control system is designed such that the parameters required to adapt the control system to a particular power plant are stored in nonvolatile memory means, and are accessible to a operator of the plant. The control system can therefore be readily adapted to a particulr power plant, without requiring customized design work.

In a preferred embodiment, the control system is adapted for controlling a power plant that comprises a generator, a turbine for converting the flow of a fluid (i.e., a liquid or gas) into mechanical power to drive the generator, control means for regulating the flow of such fluid, a voltage regulator, a bus, and a main circuit breaker for selectively connecting the generator to the bus. The voltage regulator controls the generator field in accordance with a predetermined voltage setpoint, to thereby control the voltage produced by the generator. The control system comprises nonvolatile memory means, input means, multitasking processing means and edit means. The nonvolatile memory means stores configuration data comprising a plurality of configuration parameters for the power plant. The input means produces input data concerning current plant conditions, including turbine speed, control means state or position, generator current and voltage, the current and voltage on the bus, and the position of the main circuit breaker. The multitasking processing means processes the input data in accordance with the configuration data, to produce control signals for controlling the power plant. Such control signals include breaker signals for tripping and closing the main circuit breaker, voltage level signals for establishing the voltage setpoint of the voltage regulator, and a control signal for controlling the state or position of the control means. Finally, the edit means enables an operator to edit the configuration data, to thereby configure the control system for a particular power plant. In a preferred embodiment, the control system further comprises a communication port through which the configuration data may be loaded to and from an external device on which the configuration data may be edited.

DETAILED DESCRIPTION OF THE INVENTION

Figure 1:
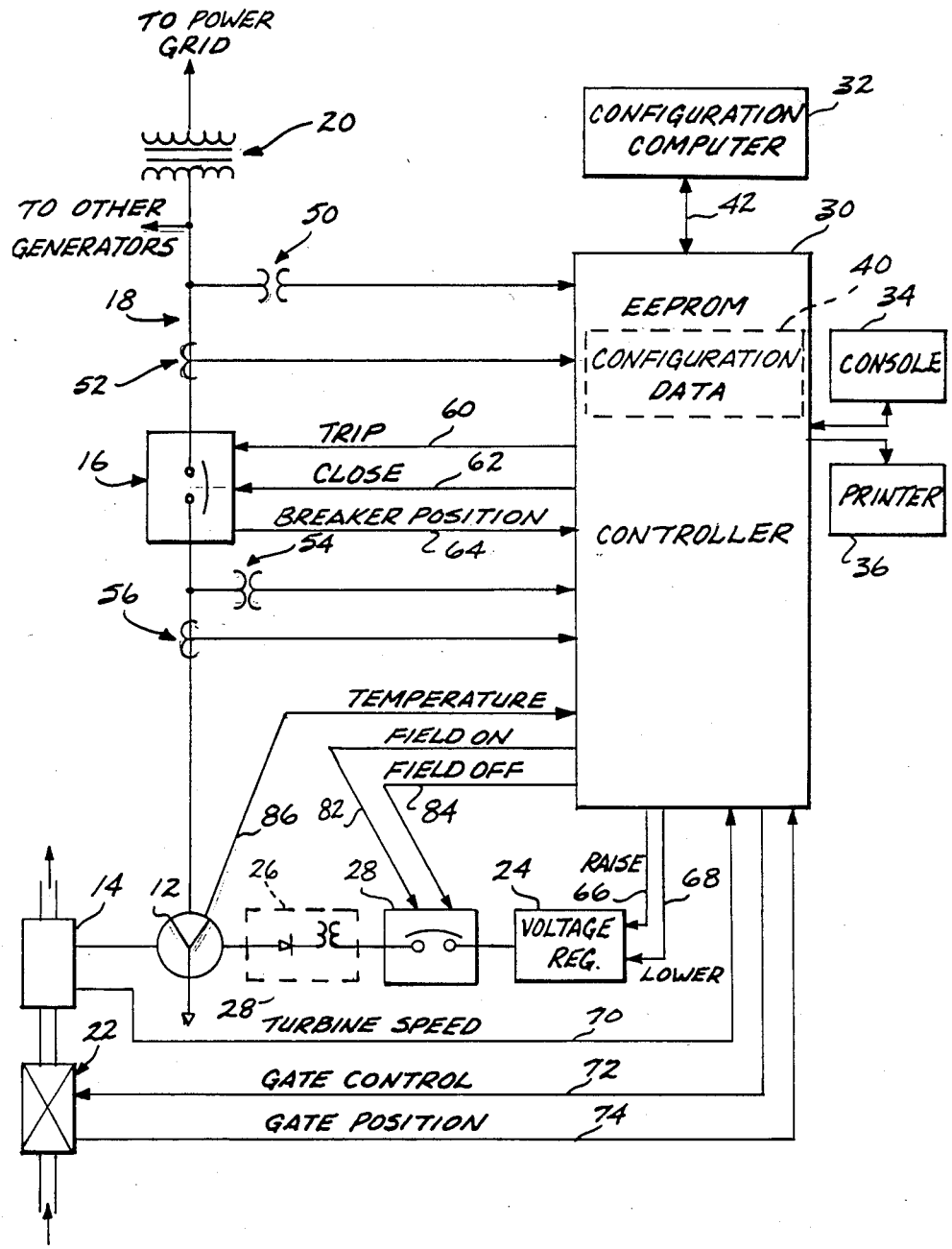
FIG. 1 is an overall block diagram of an electric power plant with a control system according to the present invention.

One preferred embodiment of the invention will be described herein with reference to a hydroelectric power plant having a Francis turbine. Referring to FIG. 1, the principal components of the power plant include generator 12, turbine 14, main circuit breaker 16, bus 18 and transformer 20. The flow of water through the turbine is controlled by gate 22. The voltage produced by generator 12 is controlled by voltage regulator 24 that is coupled to the field coils of the generator via interface circuit 26 and field circuit breaker 28. When main circuit breaker 16 is closed, the generator is coupled via transformer 20 to a power grid. In a multiple generator plant, bus 18 would also be coupled to other generators.

In the embodiment shown in FIG. 1, the control system of the present invention comprises controller 30, configuration computer 32, console 34 and printer 36. Controller 30 directly controls the components of the power plant, utilizing configuration data 40 that is stored in electronically erasable, programmable read-only memory (EEPROM) within the controller. The configuration data may be modified by an operator of the power plant by means of configuration computer 32. In particular, configuration data 40 can be transferred to and from the configuration computer via communication line 42 that may comprise an RS-232 serial interface. The configuration computer may be operated so as to edit the configuration data, whereupon the edited configuration data can be transferred back to controller 30 over the communication link. Console 34 is provided for enabling an operator to enter commands to controller 30, and to display current operating conditions, alarms, and other pertinent information to the operator. Printer 36 functions to print a log to reliably record events relating to operation of the power plant.

FIG. 1 illustrates the interconnections that permit controller 30 to monitor and control power plant operation. The voltage and current on bus 18 are measured by potential transformer (PT) 50 and current transformer (CT) 52 respectively. The voltage and current output by generator 12 are similarly monitored by PT 54 and CT 56. Control lines 60 and 62 interconnect controller 30 and main circuit breaker 16, and carry TRIP and CLOSE signals for respectively tripping (opening) and closing the main circuit breaker. The main circuit breaker position (opened or closed) is monitored by the controller via a BREAKER POSITION signal on line 64. The temperature of the stator or generator 12 are monitored by the controller via a TEMPERATURE signal on line 86. Additional monitoring lines and temperature sensors may be provided for other elements of the power plant such as the generator bearings. The state of field circuit breaker 28 is controlled by FIELD ON and FIELD OFF signals on lines 82 and 84 respectively. RAISE and LOWER signals for raising and lowering the voltage setpoint of voltage regulator 24 are provided by controller 30 on lines 66 and 68 respectively. The controller monitors the speed of turbine 14 via line 70, and controls gate 22 via a GATE CONTROL signal on line 72. The controller monitors the gate position by means of a GATE POSITION signal on line 74.

Figure 2:
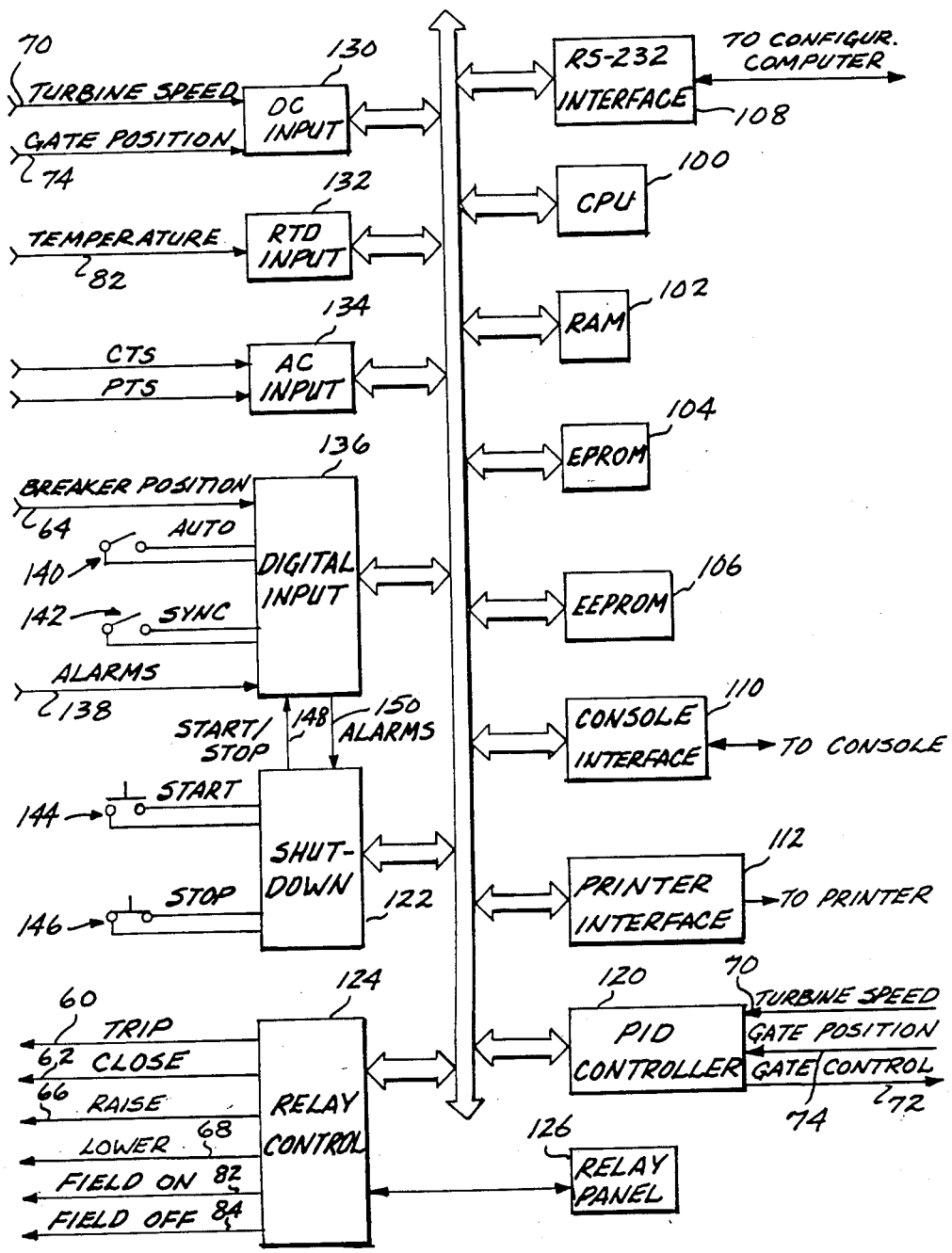
FIG. 2 is a block diagram of the controller.

The principal hardware components of controller 30 are illustrated in FIG. 2. The controller includes CPU 100 and memories 102, 104 and 106. Memory 102 is a RAM memory, and is used for the temporary storage of data. Memory 104 is an erasable, programmable read-only memory (EPROM), and is used for storage of programs used to operate CPU 100. Memory 106 is an EEPROM memory, described above, and is used for storage of the configuration data. The configuration data is transferred to and from the controller via RS 232 interface 108. Interfaces 110 and 112 are provided for console 34 and printer 36 respectively.

Other components of controller 30 shown in FIG. 2 include PID controller 120, shut-down module 122, relay control module 124 and associated relay panel 126, and input modules 130, 132, 134 and 136. PID controller 120 receives the TURBINE SPEED and GATE POSITION signals on lines 70 and 74 respectively, and provides the GATE CONTROL signal on line 72. Suitable PID controllers are well-known to those skilled in the art of process control. Input module 130 is provided for DC inputs, and is also connected to receive the TURBINE SPEED signal on line 70 and the GATE POSITION signal on line 74. Input module 132 is a conventional RTD input module, and is connected to receive one or more TEMPERATURE signals, such as the stator temperature signal on line 82. Module 134 is an AC input module, and receives the signals from the CTs and PTs. Input module 136 is a digital input module, and is connected to receive the BREAKER POSITION signal on line 64, and one or more alarm signals collectively indicated by the signal ALARMS on line 138. For each alarm signal, the digital input module provides a pair of terminals, and means for sensing whether an external switch connected to the terminals is open or closed. Input module 136 is also connected to external auto switch 140 and external sync switch 142 for permitting an operator to specify the Auto and Synchronize modes, as described below.

Shut-down module 122 includes start and stop switches 144 and 146 respectively. The start/stop status of the shutdown module is communicated to input module 136 via line 148. The status of certain of the alarm inputs to the digital input module are sent to shut-down module 122 via lines 150. In particular, each alarm in the digital input modle can be configured as either a hardware or software alarm. Hardware alarms are routed to the shutdown module via lines 150. Software alarms are sensed by CPU 100, as described more fully below. Relay control module 124 controls circuit breakers 16 and 28 and voltage regulator 24. Main circuit breaker 16 is controlled via TRIP and CLOSE lines 60 and 62 respectively, voltage regulator 24 is controlled by RAISE and LOWER signals on lines 66 and 68 respectively, and field circuit breaker 28 is controlled by FIELD ON and FIELD OFF signals on lines 82 and 84 respectively. Relay panel 126 is provided for permitting an operator to manually control any of these relay signals.

Figure 3:
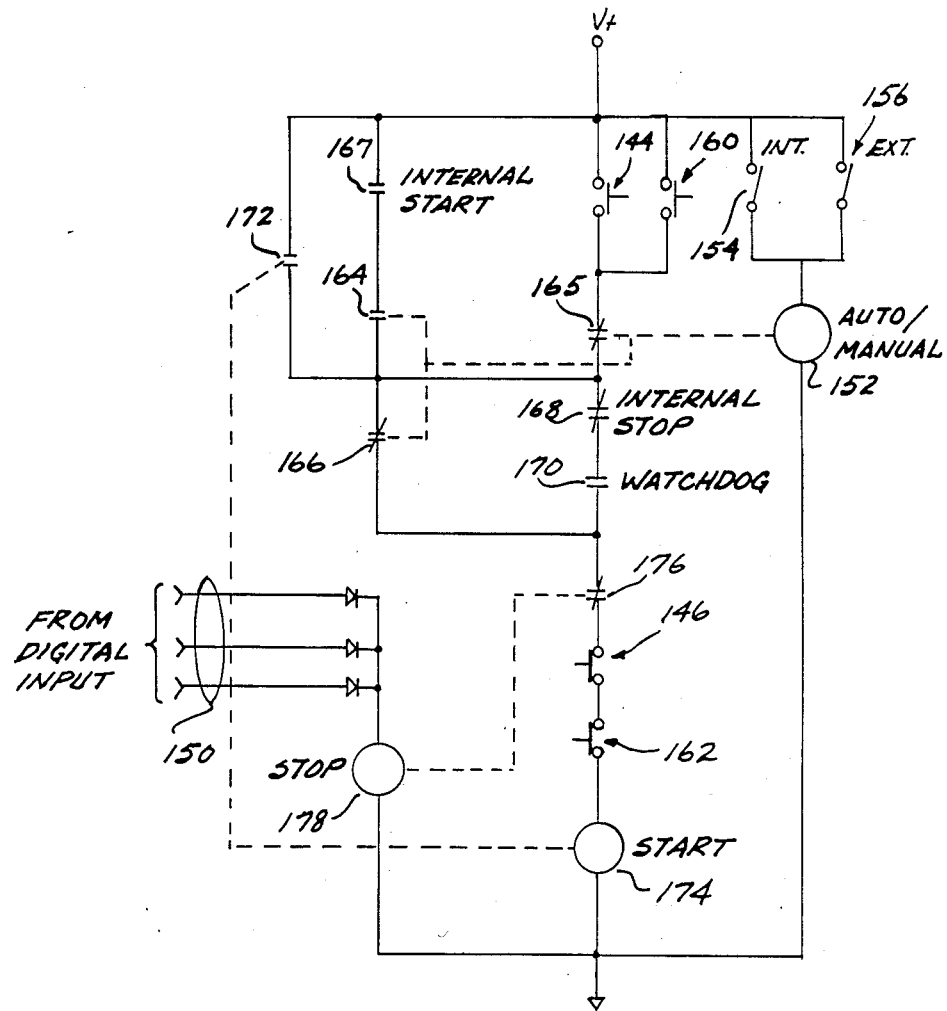
FIG. 3 is a relay ladder diagram of the shutdown module.

FIG. 3 presents a relay diagram illustrating the operation of shut-down module 122. The shut-down module includes normally open start switch 144 and normally closed STOP switch 146. Additional normally open start switches may be connected in parallel with start switch 144, and additional normally closed stop switches may be connected in series with stop switch 146. One additional start switch 160 and one additional stop switch 162 are shown in FIG. 3. FIG. 3 also illustrates auto/manual relay 152 and associated normally open auto contacts 164 and normally closed manual contacts 165 and 166, normally open internal auto switch 154 and external auto switch 156, normally open internal start contacts 167, normally closed internal stop contacts 168, watch-dog contacts 170, start relay contacts 172 controlled by start relay 174, and stop relay contacts 176 controlled by stop relay 178. Stop relay 178 is energized by an alarm signal on any one of lines 150 from the digital input module. Switches 144, 146, 154, 156, 160 and 162 are controlled by an operator of the power plant. Internal start contacts 167 and internal stop contacts 168 are operated by CPU 100 in a manner to be described. Auto contacts 164 and manual contacts 165 and 166 are controlled by auto/manual relay 152. The auto contacts are closed and the manual contacts are open when the controller is in Auto mode with either of switches 154 or 156 closed. When the controller is not in Auto mode, the manual contacts are closed and the auto contacts are open. Watch-dog contacts 170 are connected to a conventional watch-dog circuit for monitoring CPU 100. If the CPU remains inactive for a prescribed length of time, the watch-dog circuit resets the CPU and opens watch-dog contacts 170. The entire circuit in FIG. 3 is connected to a source of positive potential, such as source preferably being a battery to permit operation the shut-down module independently of the availability of line power.

The condition of start relay 174 is sensed by controller 30 via line 148 and digital input module 136, and used to determine whether the power plant is in a started or stopped state. The operation of the circuit shown in FIG. 3 can be described by initially assuming that the system is in a manual stopped state with all stop switches and contacts closed, manual contacts 165 and 166 closed, all start switches and contacts open, auto contacts 164 open, watch-dog contacts 170 closed, and no alarm signals on lines 150. In this state, there is no current through start relay 174 or stop relay 178, and as a result start relay contacts 172 are open and stop relay contacts 176 are closed. When an operator then momentarily closes start switch 144, a current path is created through the start switch, manual contacts 165 and 166, stop relay contacts 176, stop switches 146 and 162, and start relay 174, thus energizing the start relay and putting the system into the started state. Energization of the start relay closes start relay contacts 172, such that the start relay remains energized and the system remains in the started state even when normally open start switch 144 is then released. As long as the system remains in manual mode, the started state will continue until stop switch 146 or stop switch 162 is actuated by an operator, or until stop relay contacts 176 are opened due to the presence of an alarm on lines 150. In any of these cases, cessation of current through start relay 174 causes start relay contacts 172 to open, putting the system into the stopped state. The system will then remain in the stopped state even after stop switches 146 and 162 are allowed to close and/or the alarm condition ceases.

When auto/manual relay 152 is energized by closure of switch 154 or 156, manual contacts 165 and 166 are open, and auto contacts 164 are closed. Start switches 144 and 160 are thus effectively removed from the circuit, and current through the upper portion of the relay ladder can only be initiated by the closure of internal start switch 167. Similarly, the opening of manual contacts 166 puts internal stops contacts 168 and watch-dog contacts 170 and back into the circuit. Thus in Auto mode, the normal starting and stopping operations are controlled by the internal start and stop contacts, but external stop switches 146 and 162 remain operative to force the system into the stopped state.

Figures 4, 5A:
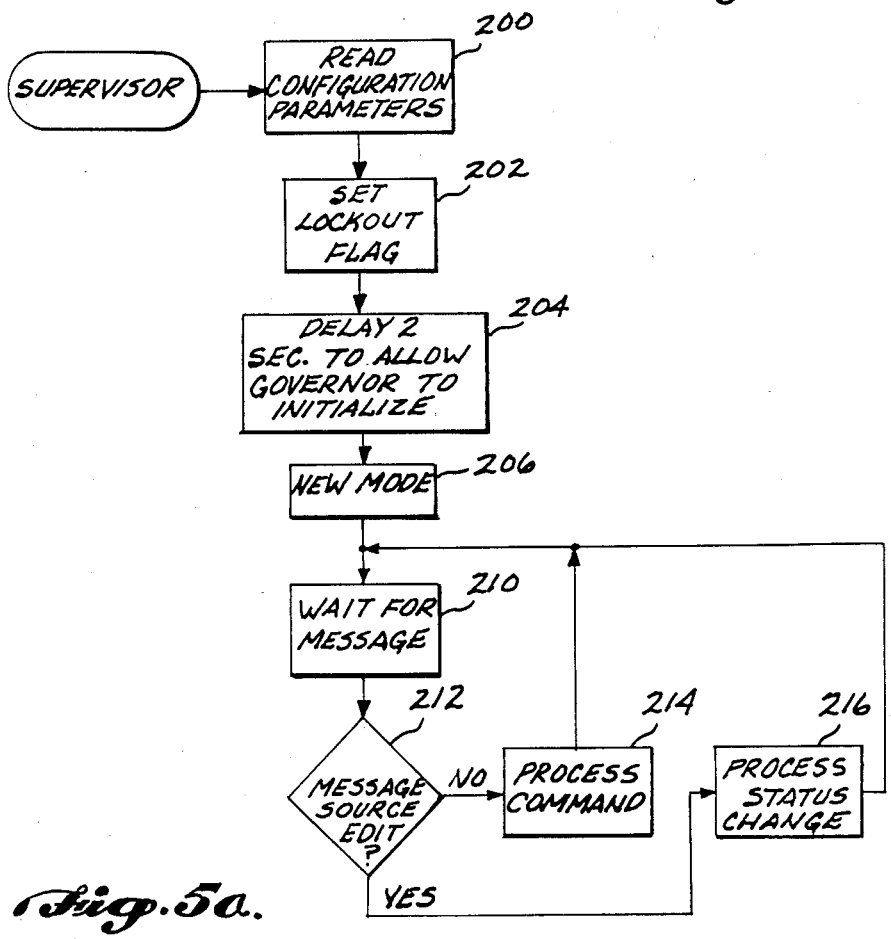
FIG. 4 is a chart illustrating the operating modes.

The operating modes of a preferred embodiment of the control system are shown in more detail in FIG. 4. There are two stopped modes—Emergency Stop and Normal Stop, and four started modes—Isolated, Synchronized, On-Line and Auto. The mode that the system is in at any given time is governed by the state relay 174 (FIG. 3), the state of sync switch 142 and auto switch 140 (FIG. 2), and the position (open or closed) of main circuit breaker 16. With respect to the condition of start relay 174, the state ON means that the relay is energized and that start relay contacts 172 are closed, while the state OFF designates that the relay is not energized and that start relay contacts 172 are open. As shown in FIG. 4, the system is in one of the stopped modes (Emergency or Normal) whenever the start relay is off, Emergency Stop mode corresponding to an open breaker and Normal Stop mode corresponding to a closed breaker. With the start relay ON, the system will be in Isolated mode whenever sync switch 142 is open, i.e., whenever the operator has not selected Sync mode. When Sync mode has been selected, the system will be in Synchronize mode when the breaker is open, and will be in either On-Line or Auto mode when the breaker closes, the selection between On-Line and Auto modes being determined by the position of auto switch 140.

In the Emergency Stop mode, the system will open field circuit breaker 28, and will move gate 22 to a predetermined position in a predetermined time period, such position and time period being configurable by means of configuration data 40. In the Normal Stop mode, the control system will either move the gate as in the Emergency Stop mode, or attempt to maintain the generator frequency at the nominal system frequency. The Isolated mode is intended for use when the system will be used as a stand-alone power generator, not connected to a power grid. In such a configuration, the power plant cannot relay on the grid to maintain the prescribed voltage and frequency, and the control system will therefore control these parameters itself. In particular, in the Isolated mode, the control system will maintain the frequency of the generator output at either a nominal system frequency or at a crystal controlled clock frequency. In this mode, the breaker will be closed whenever the generator frequency matches the nominal frequency. Furthermore, field circuit breaker 28 will be closed when a prescribed frequency range has been achieved, and voltage regulator 24 will control the generator voltage to a configurable setpoint.

Synchronize mode is used to start the power plant when the power plant is to be connected to an external power grid. In Synchronize mode, the control system will control the generator speed to match the phase and frequency of the generator output to the phase and frequency on bus 18, and will close main circuit breaker 16 when the phase, frequency and voltages match. FIG. 4 indicates that when main circuit breaker 16 is closed, the system will change to the On-Line or Auto mode, depending upon the state of auto switch 140. In On-Line mode, gate 22 will be open to a configurable position, and the control system will permit this position to be varied by an operator via console 34. In Auto mode, the operator can select from up to ten different power control modes that are described below.

Though the description given above has been for a hydroelectric plant having a Frances turbine, the description would be largely unchanged for other types of power plants. For example, in a hydroelectric plant having an impulse or Pelton type turbine, deflectors serve the role played by gate 22 in the Frances turbine system. Thus in a controller for an impulse-type hydroelectric plant, controller 30 would provide a DEFLECTOR CONTROL signal to the deflectors, and receive a DEFLECTOR POSITION signal from the deflectors.

A second difference between an impulse and a Frances system is that the controller must provide signals for controlling the nozzles that form the water jets. The nozzles would be controlled by OPEN and CLOSE signals generated by relay control module 124, and the nozzle positions would be sensed by input module 130.

The software for controlling the operation of CPU 100 forms an important part of the control system of the present invention. Although in principle, the CPU could operate with virtually any type of software system, the preferred software arrangement comprises a multitasking operating system that is event driven and that includes facilities for priority scheduling. The reasons for this preference will become clear in the following description. As is well known to those skilled in the art, the term "multitasking" refers to the fact that multiple jobs or main programs can be concurrently operated by a single processor. The term "event driven", when used to refer to multitasking system, means that individual tasks can be activated or deactivated based on the occurrence of certain events that are outside the direct control of the task. In a preferred system, the "event driven" feature is implemented by providing the facility for each task to send and received messages and flags from other tasks. A given task can then be set up such that the task does not commence or recommence execution until a particular message is received or flag is set. Finally, the term "priority scheduling" refers to the fact that each task is assigned a predetermined priority, and that access to the CPU is based upon such priority.

One preferred way to implement a priority arrangement is to provide a scheduler that comprises a task having the highest priority. Each taske has a status indicating whether the task is waiting for CPU time, or is waiting for some other condition to change (e.g., a message to be received) before the task can make use of CPU time. The scheduler maintains a list of task and task status. Whenever any condition changes that might affect any task's ability to make use of CPU time, the task list is searched to determine a highest priority task that is now capable of using the CPU. Control is then assigned to such task. This technique assures that the CPU is placed under the control of the highest priority task that is capable of using the CPU.

The application software for controlling CPU 100 is set forth in the flow charts of FIGS. 5-10. In general, the software can be divided into a supervisor module that includes a SUPERVISOR task for coordinating and controlling the execution of the other tasks, a data acquisition module comprising a set of task for inputting data values from the various input modules shown in FIG. 2, a control module comprising a plurality of control system tasks for controlling circuit breakers 16 and 28, gate 22 and voltage regulator 24, and a communication module comprising a set of tasks relating to the operation of console 34, printer, and RS-232 interface 108.

As described above, the programs for operating CPU 100 make use of configuration data 40 that is stored in EEPROM 106 that can be modified by an operator utilizing configuration computer 32. In one preferred embodiment, the modification of the configuration data makes use of a transfer program stored in EEPROM 104. Configuration computer 32 sends a predetermined message to controller 30 that causes CPU 100 to transfer control to the transfer program. The transfer program reads the contents of EEPROM 106 out of the controller via RS-232 interface 108 to the configuration computer. The configuration computer then makes use of any conventional or special purpose editing program to permit an operator to change any of the elements of the configuration data. The configuration computer then transmits the entire configuration data set back to controller 30, and the transfer program causes the edited configuration data to be restored in EEPROM 106. This arrangement provides significant versatility, since configuration computer 32 can be any computer, including a personal computer, and the interface between the controller and personal computer is a conventional serial interface. This arrangement also permits a wide choice in the software for operating the configuration computer.

An exemplary configuration data set is set forth in Table I. The first column of Table I is a designator for a particular configuration parameter, the designators being utilized in the flow charts of FIGS. 5-16. The second column of Table I provides the task or tasks that utilize the configuration parameter. The third column of Table I provides a suitable default value for the configuration parameter, and the fourth column of Table I provides a brief explanation of the significance of the configuration parameter. The information set forth in Table I may be used by the configuration computer to prompt or guide an operator in editing of the configuration data.

The SUPERVISOR task is set forth in FIGS. 5a-5f. Referring initially to FIG. 5a, the SUPREVISOR task being in block 200 by reading the configuration parameters from EEPROM 106 to RAM 102. This step permits these parameters to be temporarily varied during plant operation, for example by an operator via console 34, without modifying the configuration data itself in EEPROM 106. In block 202, the SUPERVISOR sets a lockout flag. The lockout flag will be explained in more detail below. However in general, it operates to prevent the restarting of the system, for example after a shutdown due to an alarm, unless the lockout flag is expressly cleared by an operator via console 34. Block 204 generates a two second delay in order to permit the GOVERNOR task to initialize. In a multitasking operating system, such as delay is accomplished by executing an operating system command that takes the SUPERVISOR task out of the scheduling queue for two seconds. After the two second delay, control passes to the New Mode subtask at block 206. The term subtask here is used to refer only to a logical subdivision of a task, subtasks having no significance at the operating system level.

Figure 5B:
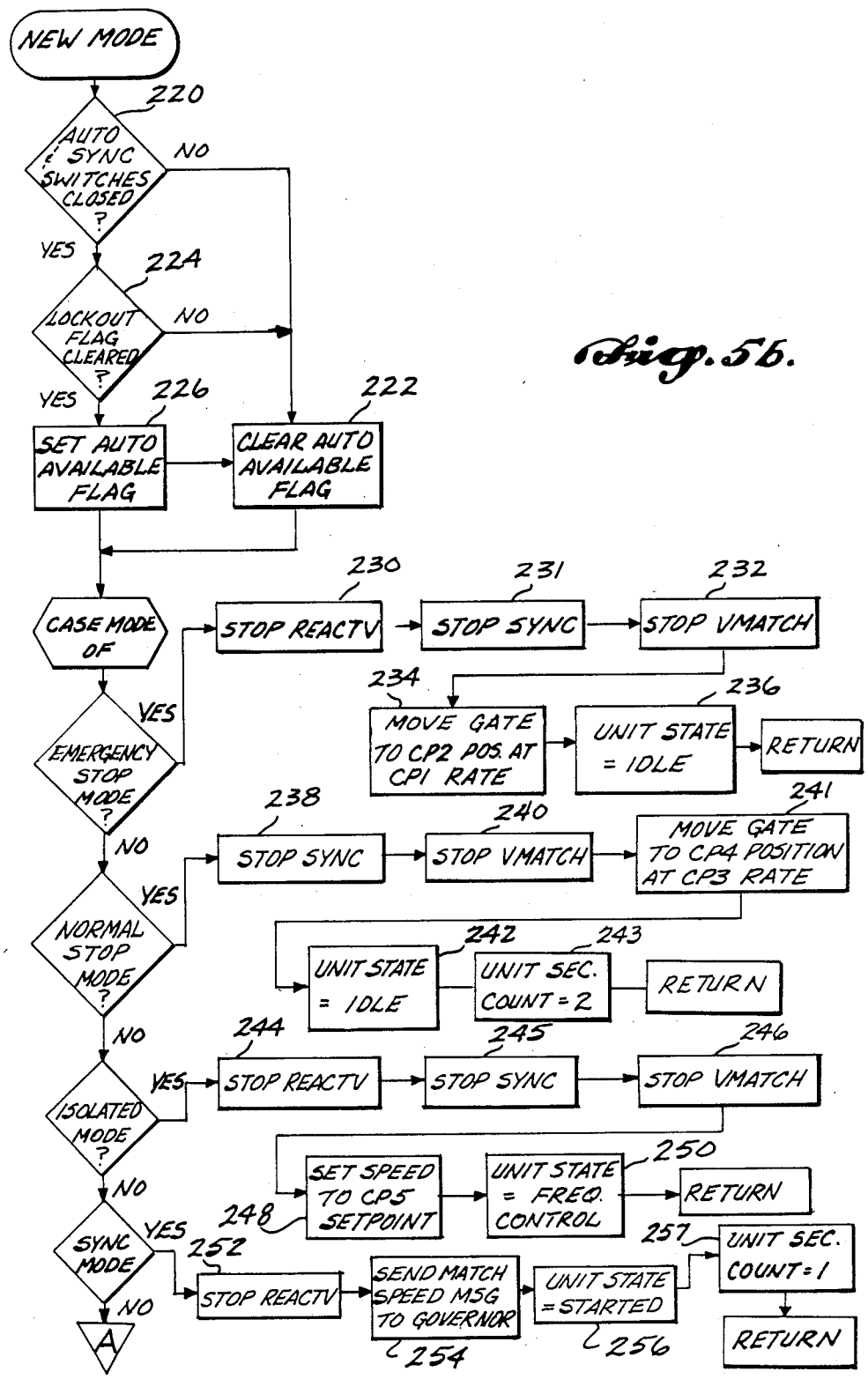
FIGS. 5(a through f) and 6-16 are flow charts of the software for operating the controller.
Figure 5C:
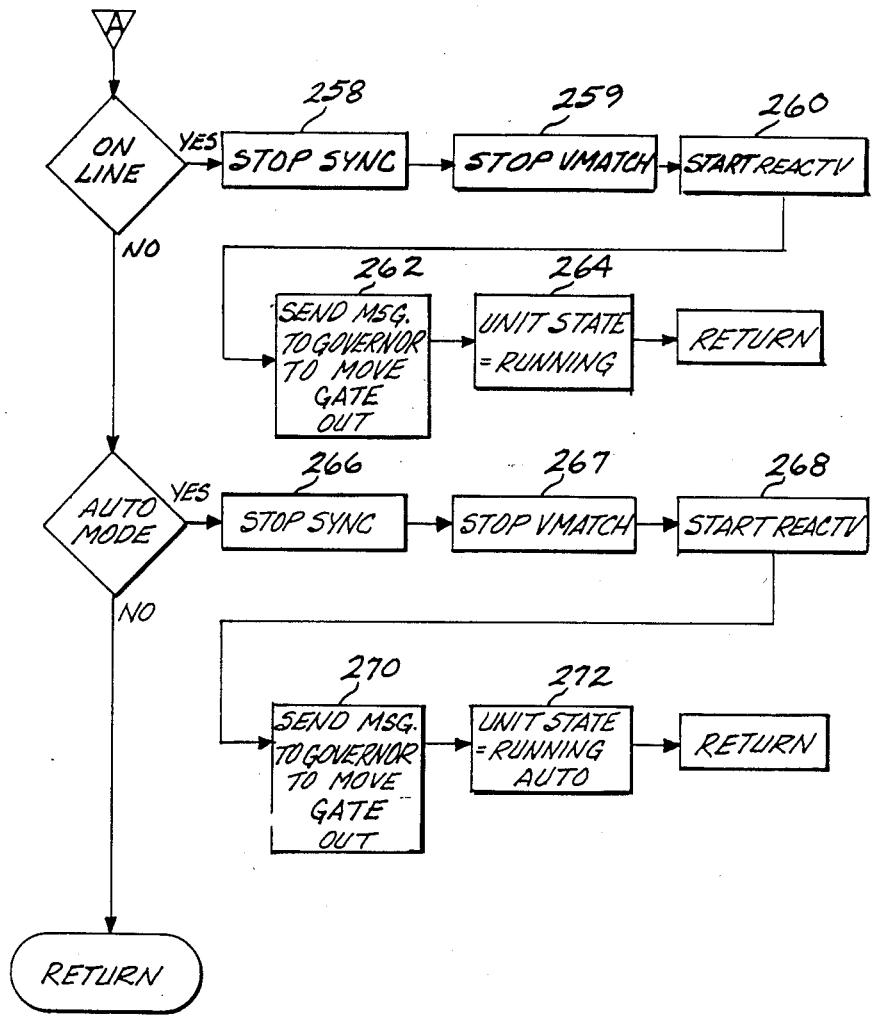

The New Mode subtask is set forth in FIGS. 5b-5c. The subtask begins in block 220 by checking the states of auto switch 140 and sync switch 142. If either of these switches is open, then an auto available flag is cleared in block 222. If both the auto and sync switches are closed, then block 224 checks to determine whether the lockout flag is cleared. If it is not, then block 222 is executed, whereas if the lockout flag has been cleared, the auto available flag is set in block 226. The auto available flag is used to signal to the Auto Adjust subtask (described below) that the power plant may be operated in Auto mode.

Once the auto available flag has been set or cleared, the New Mode subtask proceeds to determine the current mode, based upon the logic shown in FIG. 4. If the system is in Emergency Stop mode, then blocks 230-232 send stop messages to the REACTV, SYNC and VMATCH tasks respectively. These tasks will be described below. However in general, the effect of these messages is to stop these processes. Block 234 then causes the issuance of appropriate gate control signals by PID controller 120 to cause the gate to move to a position designated by configuration parameter CP2 at a rate specified by configuration parameter CP1. The SUPERVISOR then sets a unit state parameter equal to "idle" in block 236. The value of the unit state parameter is displayed to the operator by console 34, and serves to provide a brief and readily understood summary of the present condition of the power plant. After resetting the unit state parameter in block 236, the New Mode subtask returns to the main SUPERVISOR task. In an impulse or Pelton type of hydroelectric plant, the New Mode subtask would at this point also determine whether or not the appropriate configuration parameter specified that the needle should be closed upon Emergency Stop and, if so, issue appropriate commands via the relay control module to close the needles.

If the system is in Normal Stop mode, then stop messages are sent to the SYNC and VMATCH tasks in blocks 238 and 240 respectively. Block 241 then causes gate movement in accordance with the CP3 and CP4 parameters. In an impulse hydroelectric plant, a close needle command would also be issued at this time. The SUPERVISOR task then sets the unit state equal to "idle" in block 242, and sets the unit second count equal to 2 in block 243. As described below, the unit second count defines the frequency at which ceertain monitoring operations are carried out in Normal Stop or Sync mode. After execution of block 243, control returns to the main SUPERVISOR task of FIG. 5a. If the system is in Isolated mode, then stop messages are sent to the REACTV, SYNC and VMATCH tasks in blocks 244-246 respectively, and block 248 then sets the turbine speed parameter to the nominal frequency setpoint designated by CP5. Block 250 then sets the unit state equal to "frequency control," and returns to the main SUPERVISOR task.

If the system is in Syn mode, then a stop message is sent to the REACTV task in block 252 and block 254 then sends a "match speed" message to the GOVERNOR task. Blocks 256 and 257 then set the unit state equal to "started" and the unit second count equal to 1, and control is then returned to the main SUPERVISOR task. In the On-Line mode, stop messages are sent to the SYNC and VMATCH tasks in blocks 258 and 259, and a start message is sent to the REACTV task in block 260. Block 262 then sends the GOVERNOR task a message to move the gate out, block 264 sets the unit equal to "running," and control then returns to the main SUPERVISOR task. In Auto mode, blocks 266-268 and 270 perform functions identical to blocks 258-260 and 262, and block 272 then sets the unit state equal to "running auto," whereupon control is returned to the main SUPERVISOR task shown in FIG. 5a.

When the SUPERVISOR completes the New Mode subtask, it waits for a message in block 210. When the SUPERVISOR receives a message, it first determines in block 212 whether the source of the message was the COMMAND task or the EDIT task. COMMAND is the name of the task that is responsible for parsing and interpreting commands entered by an operator via console 34. When a complete operator input has been received and identified, the COMMAND task (not illustrated in the figures) sends a message to the SUPERVISOR indicating the type of command and any parameters associated with the command. The EDIT task, on the other hand, is responsible for detecting that one of the digital parameters monitored by the controller has changed. When such a change has occurred, the EDIT task sends a message to the SUPERVISOR identifying the changed parameter that has changed.

Figure 5D:
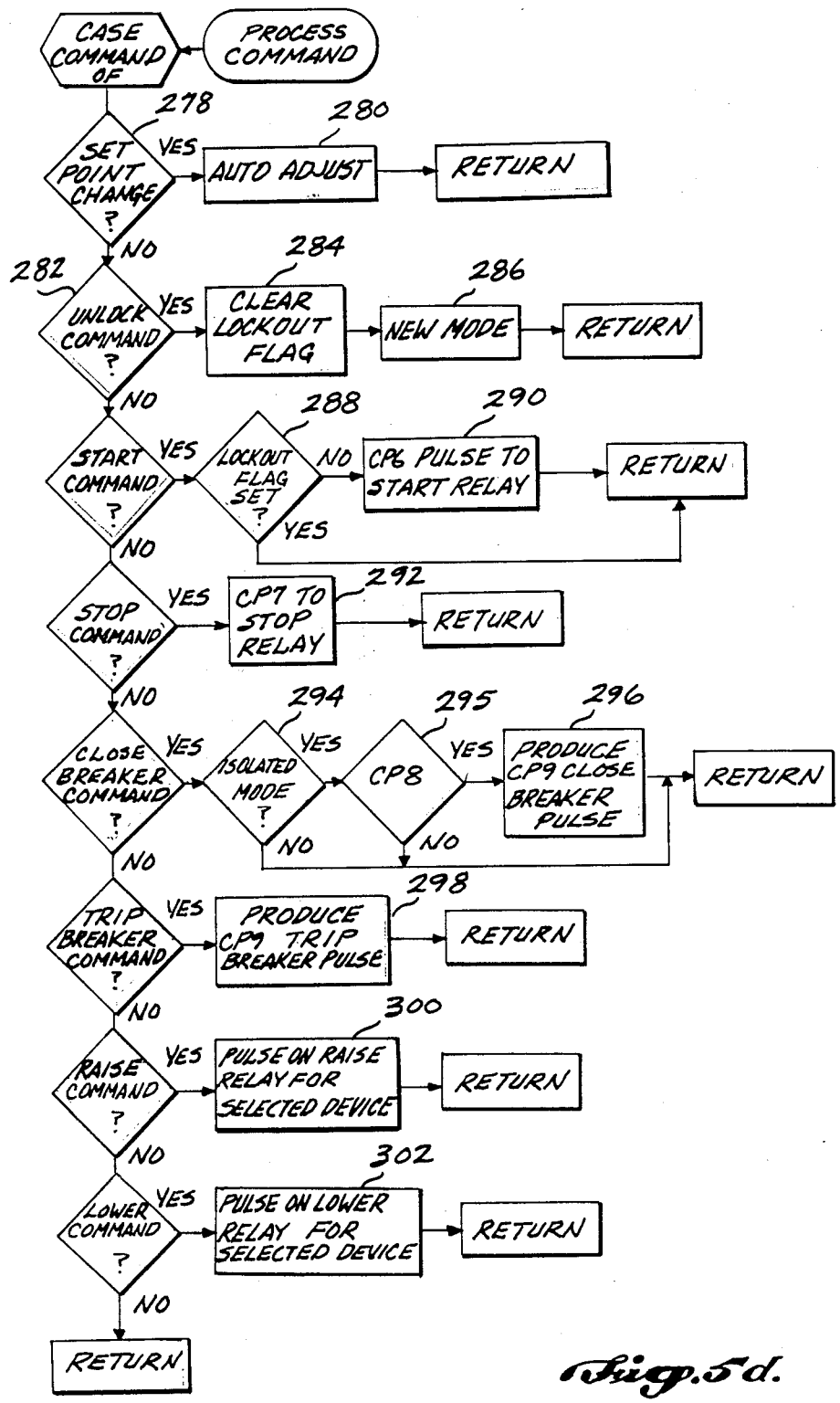

Assuming that a message has been received from the COMMAND task, the SUPERVISOR task transfers control to the Process Command subtask in block 214. The Process Command subtask is illustrated in FIG. 5d. This subtask proceeds to identify the nature of the command, and take appropriate action. Block 278 determines whether the operator has changed a setpoint, and if so the auto adjust procedure in block 280 is executed. In general, the auto adjust procedure determines the setpoint for the control of gate 22 (or the deflectors in an impulse system) to be used in Auto mode. This determination may be made based upon operator input, via console 34, indicating the type of automatic flow control to be used. For example, control of flow may be based upon kilowatt output, measured flow control, temperature control of the generator, reservoir level control, etc. The auto adjust procedure may also allocate a total flow among a number of channels in a multiple turbine power plant or among multiple nozzles in an impulse plant. If a setpoint has not been changed, block 282 determines whether an unlock command has been received. If so, then blocks 284 clears the lockout flag, and block 286 runs the New Mode subtask. The New Mode subtask is run at this time because the power plant might now be available for auto mode operation. If a start command has been received, then the Process Command subtask checks in block 288 to determine whether the lockout flag has bee set. If it has not, then block 290 causes the generation of a pulse of length CP6 that momentarily closes internal start contacts 167 (FIG. 3), thereby putting the power plant into a start condition. If the lockout flag has been set, then the start command is ignored.

If a stop command has been received, then block 292 momentarily opens internal stop contacts 168 by means of a pulse of length CP7, thereby putting the power plant into the Normal Stop mode. If a close breaker command has been received, then block 294 checks to determine whether the system is in isolated mode, and block 295 checks to determine whether CP8 is yes. If both tests are satisfied, then block 296 produces the CLOSE signal pulse of length CP9 on line 62, causing main circuit breaker 16 to be closed. If the system is not in isolated mode or if CP8 is not Y, then the close breaker command is ignored. In other modes (On Line and Auto) in which the main circuit breaker can be closed, closure is regulated by the controller independently of operator input.

If a trip beaker command has been received, then block 298 causes a TRIP signal pulse of length CP9 to be produced on line 60, thereby opening main circuit breaker 16. The trip command can be issued in any mode. If a raise command has been received, then block 300 first reads an associated parameter (supplied by the COMMAND task) to determine the device to which the command pertains, and then issues an appropriate signal. For example, in the Francis type system illustrated in FIG. 1, the only raise command available is a raise volts command that causes the controller to issue a RAISE pulse of length CP10 on line 66 that raises the setpoint of voltage regulator 24 by a predetermined amount. In an impulse-type hydroelectric plant, a raise (or lower) command could also be provided to raise or lower the needles. When a lower command has been received, then block 302 generates the appropriate LOWER signal.

Figure 5E:
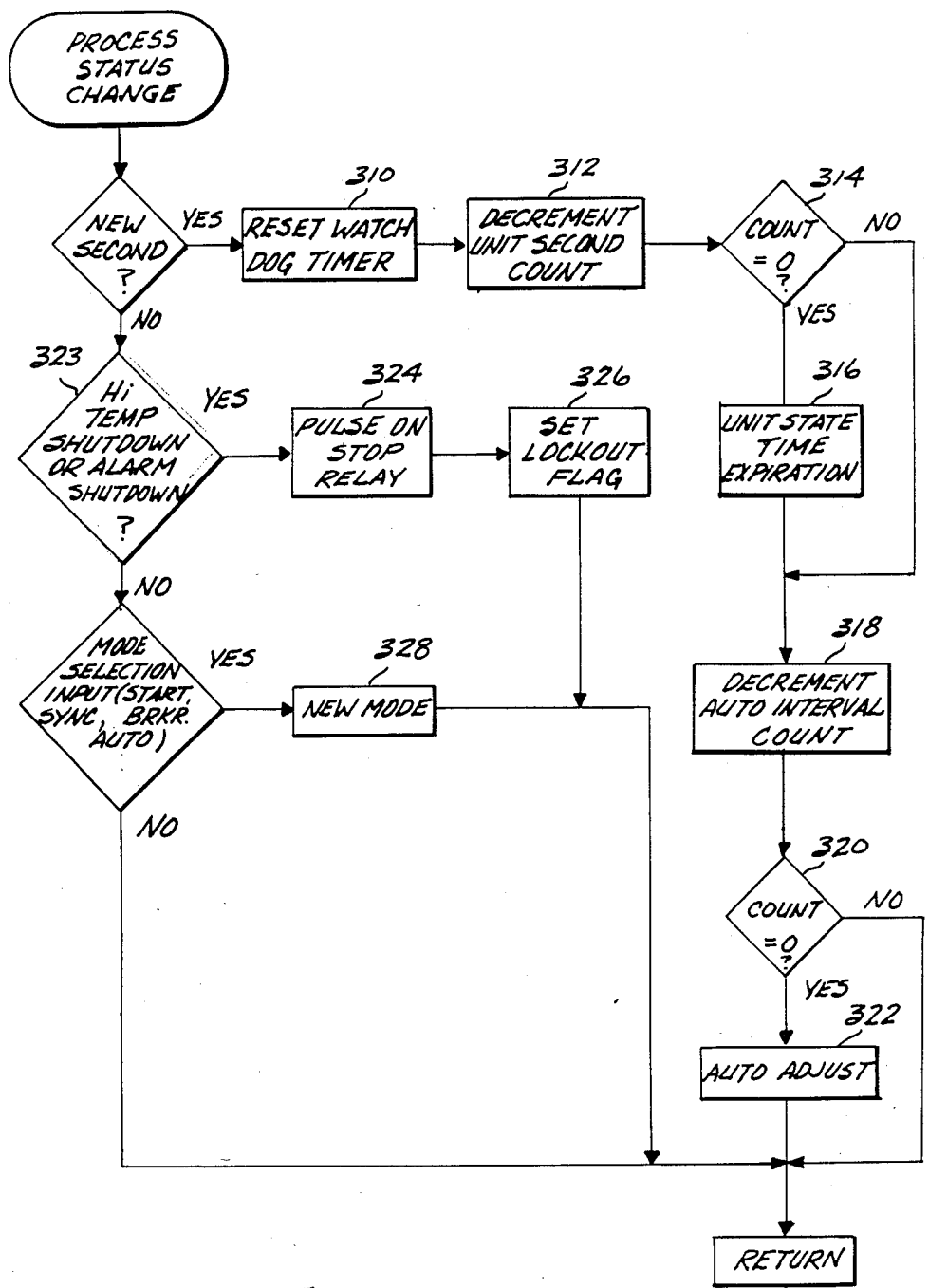

Referring again to FIG. 5a, when the SUPERVISOR receives a message from the EDIT task, it transfers control to the Process Status Change subtask in block 216. The Process Status Change subtask is illustrated in FIG. 5e. This subtask determines whether the message from the EDIT task is one of three types: a new second input, a high temperature or alarm shutdown, or a new mode selection input. As described more fully below, a new second message is sent to the SUPERVISOR task whenever one second of real time has elapsed. If a new second message has been received, then block 310 resets the watch-dog timer, and block 312 then decrements a unit second count by one. As described below, the unit second count is set to different values by the Unit State Time Expiration subtask, depending upon the current mode. Whenever block 314 determines that the unit second count has reached zero, then the Unit State Time Expiration subtask is reexecuted in block 316. By this means, the Unit State Time Expiration subtask can control its repetition frequency based upon current mode. If the unit second count has not reached zero, then block 318 decrements an auto interval count, and block 320 determines whether the auto interval count has reached zero. If so, then the above-described auto adjust procedure is executed in block 322.

Figure 5F:
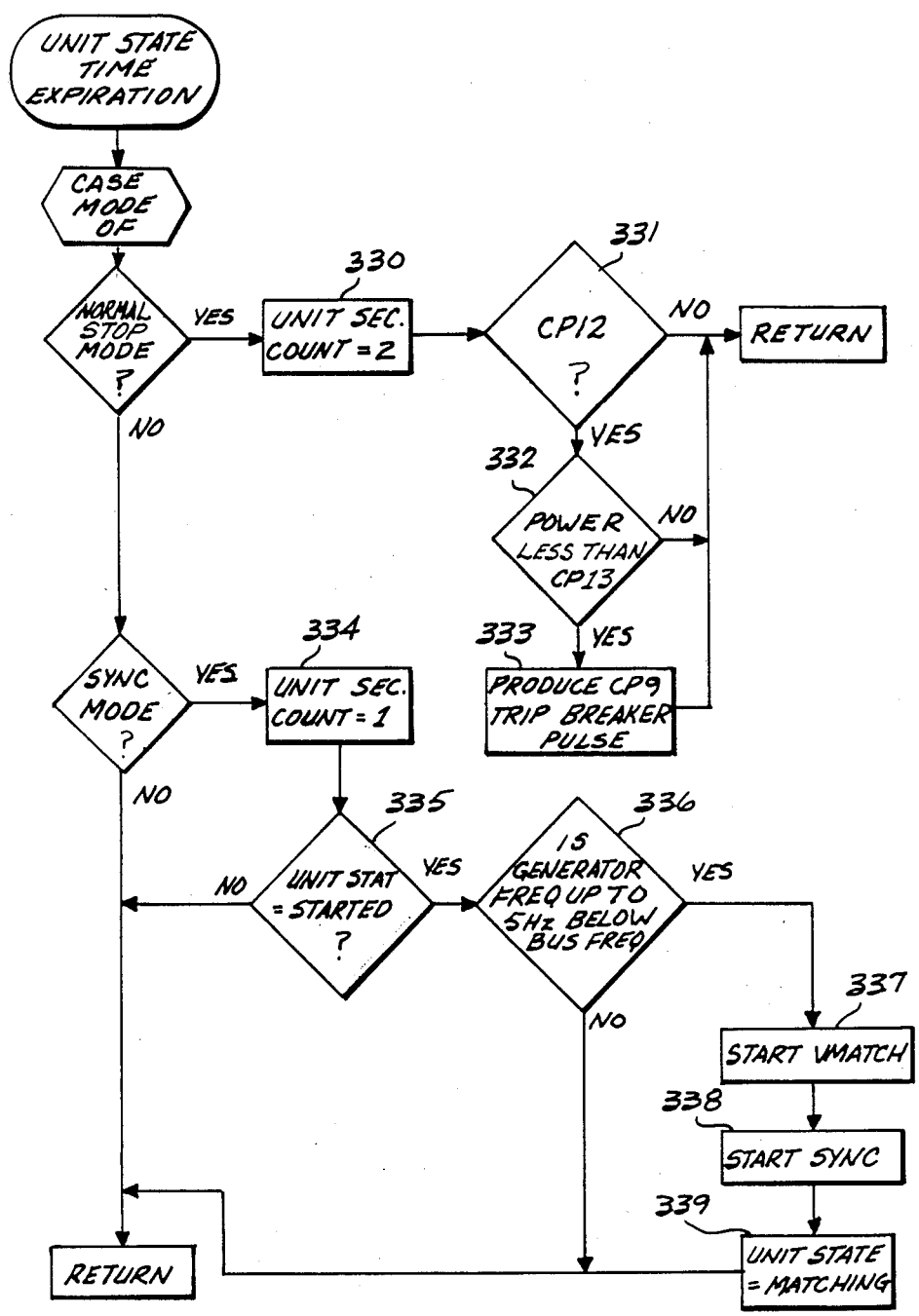

The Unit State Time Expiration subtask is set forth in FIG. 5f. This subtask determines whether the current mode is Normal Stop or Sync. If the system is Normal Stop mode, then block 330 sets the unit second count equal to two, thereby establishing a two second repetition rate for the Unit State Time Expiration subtask in Normal Stop Mode. Block 331 then checks CP12 to determine whether the main circuit breaker is to be tripped if a low power setpoint is reached. If so, then block 332 determines whether the power is less than setpoint CP13. If so, then block 333 causes the production of a trip breaker pulse of length CP9 to trip the main circuit breaker.

In Sync mode, block 334 sets the unit second count equal to one, thus causing the Unit State Time Expiration subtask to be executed each second. Block 335 then determines whether the unit state is equal to "started". If not, control is returned to the Process Status Change subtask. If so, then block 336 determines whether the generator frequency is up to 5 Hz below the bus frequency. If so, then start messages are sent to the VMATCH and SYNC tasks in blocks 337 and 338, and block 339 sets the unit state equal to "matching".

Returning to the Process Status Change subtask in FIG. 5e, block 323 is executed if the message that resulted in execution of the Process Status Change subtask was not a new second message. If the message from EDIT indicated that a high temperature shutdown limit had been reached, or that an alarm had been received, then block 324 causes internal stop contacts 168 to open, thereby putting the unit in the Normal Stop mode. Block 326 then sets the lockout flag, and control returns to the main SUPERVISOR task. Finally, when the message from EDIT indicates that the change is one that could affect mode, then block 328 causes execution of the New Mode subtask.

Figure 6:
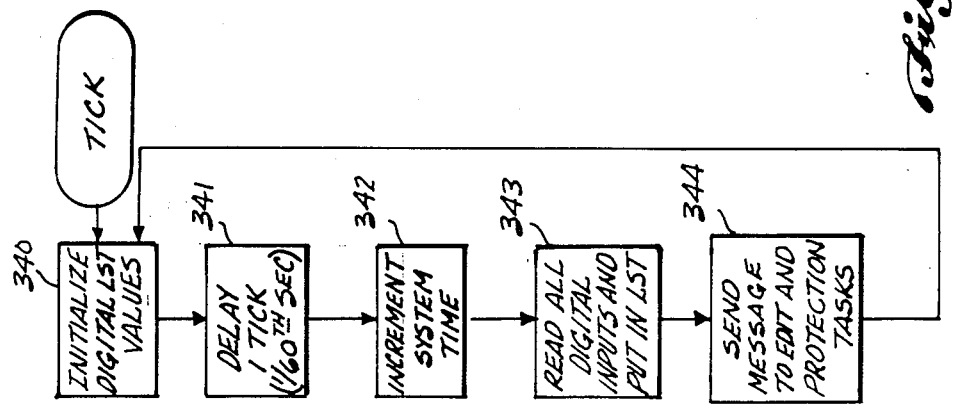

FIGS. 6-10 are flow charts of the TICK, EDIT, TRANS, TIMER and TEMPERATURE tasks respectively, all of these tasks being part of the data acquisition module. In general, the data acquisition module is responsible for updating a table, termed the LST or Local State Table, that contains current values of all inputs and other parameters monitored by the controller. Referring initially to FIG. 6, the function of the TICK task is to read the digital inputs provided to digital input module 136. These inputs are read sixty times a second to provide high time resolution, particularly for alarm and breaker position inputs. The TICK task commences in block 340 by initializing the digital LST values, and places the results in a new LST. Block 341 then delays for 1/60th of a second, whereupon block 342 increments the system time and block 343 reads the current digital inputs. Block 342 also sends a new second message to the SUPERVISOR task whenever a full second has expired. Block 344 then sends a message to the EDIT and PROTECTION tasks. The EDIT task shown in FIG. 7 recommences execution in block 345 each time that it receives this message from the TICK task. Block 346 then compares the new LST with the prior LST. If one or more items of digital data have been changed, then block 347 determines the changes that have occurred, and sends messages to the appropriate task or tasks. Messages sent by the EDIT task to the SUPERVISOR task have already been described. For example, when the EDIT task determines that an alarm condition has been changed from off to on, it sends a message to the SUPERVISOR task that causes block 324 of the process Status Change subtask to be executed, thereby pulsing the stop relay to cause the system to enter the Normal Stop mode. This is an example of a software alarm in contrast to the hardware alarms described above in connection with FIG. 3.

Figure 8:
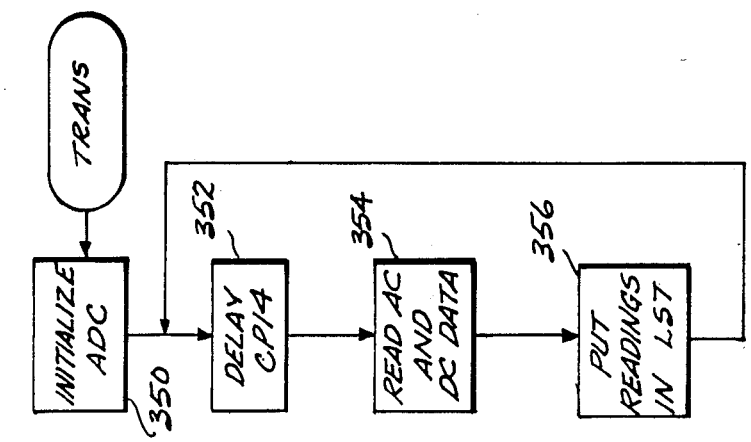
Figure 7:
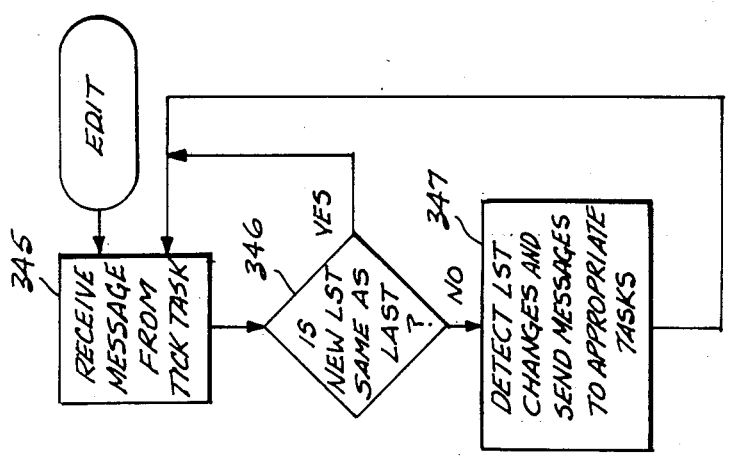

The TRANS task shown in FIG. 8 performs the function of reading the analog (AC and DC) inputs provided by input modules 130 and 134. The task commences in block 350 by initializing the analog to digital converters (ADC) contained within the analog input modules, and block 352 then produces a delay specified by CP14. In general, this delay will be longer than the 1/60th of a second delay used for reading digital inputs. When delay time CP14 has expired, block 354 reads the analog data, and block 356 puts the new data in the LST. The TRANS task then recommences the delay in block 352.

Figure 9:
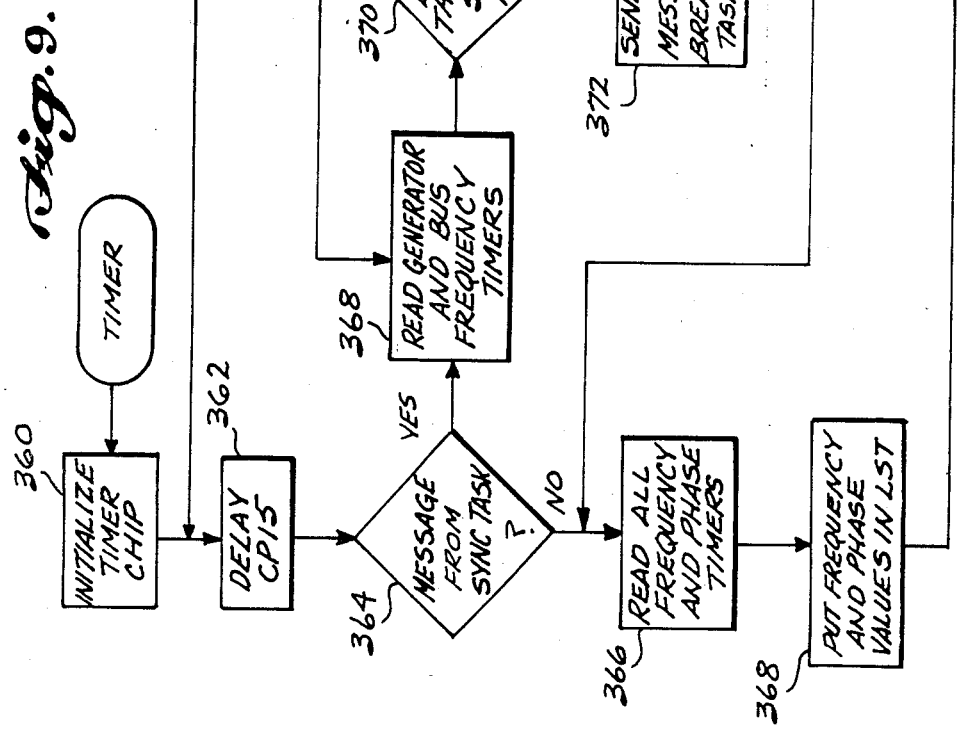

The TIMER task shown in FIG. 9 determines the frequency of generator 12 and bus 18, and also performs the phase matching portion of generator synchronization in conjunction with the SYNC task. The TIMER task commences in block 360 by initializing a timer chip (not shown) contained within controller 30. After a delay determined by CP15 in both 362, the TIMER task determines whether a message has been received from the SYNC task. If no such message has been received, then blocks 366 and 368 provide current values for frequency and phase based upon LST data produced by the TRANS task via AC input module 134, and puts the new frequency and phase values (for both generator and bus) in the LST. Control then returns to block 362. If block 364 determines that a message has been received from the SYNC task, then block 368 reads the generator and bus frequency timers, and block 370 determines whether the frequency has slipped less than five percent (5%). If so, then block 372 sends a close message to the BREAKER task that results in a CLOSE pulse being produced on line 62 to close the main circuit breaker. The TIMER task then resumes operation at block 366 as described above. The message sent to the BREAKER task includes the length for the CLOSE pulse, such length being determined by the TIMER task from CP9.

Figure 10:
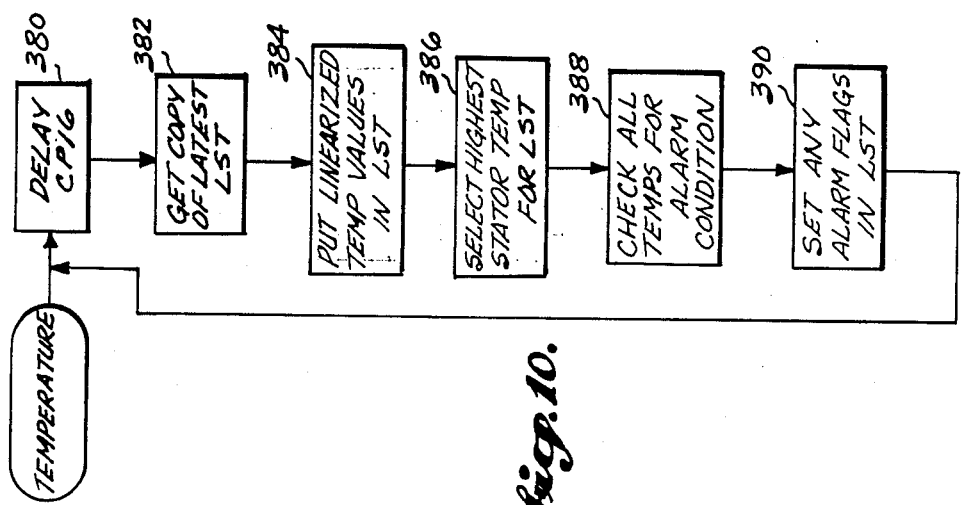

FIG. 10 sets forth the TEMPERATURE task that functions to monitor the temperature signals and generate appropriate alarm flags. Block 380 generates a delay of CP16 that sets the repetition rate of the TEMPERATURE task. Block 382 gets a copy of the latest LST, and block 384 updates the LST with the current temperature data provided via RTD input module 132. Block 386 then selects the highest stator temperature if more than one stator temperature value is provided, and places the highest temperature in a predesignated in the LST for display via console 34. Block 388 then checks all measured temperatures to determine whether any have exceeded their limits such as the limits set by CP11. If any limits are exceeded, then block 390 sets appropriate alarm flags in the LST.

Figures 11, 12:
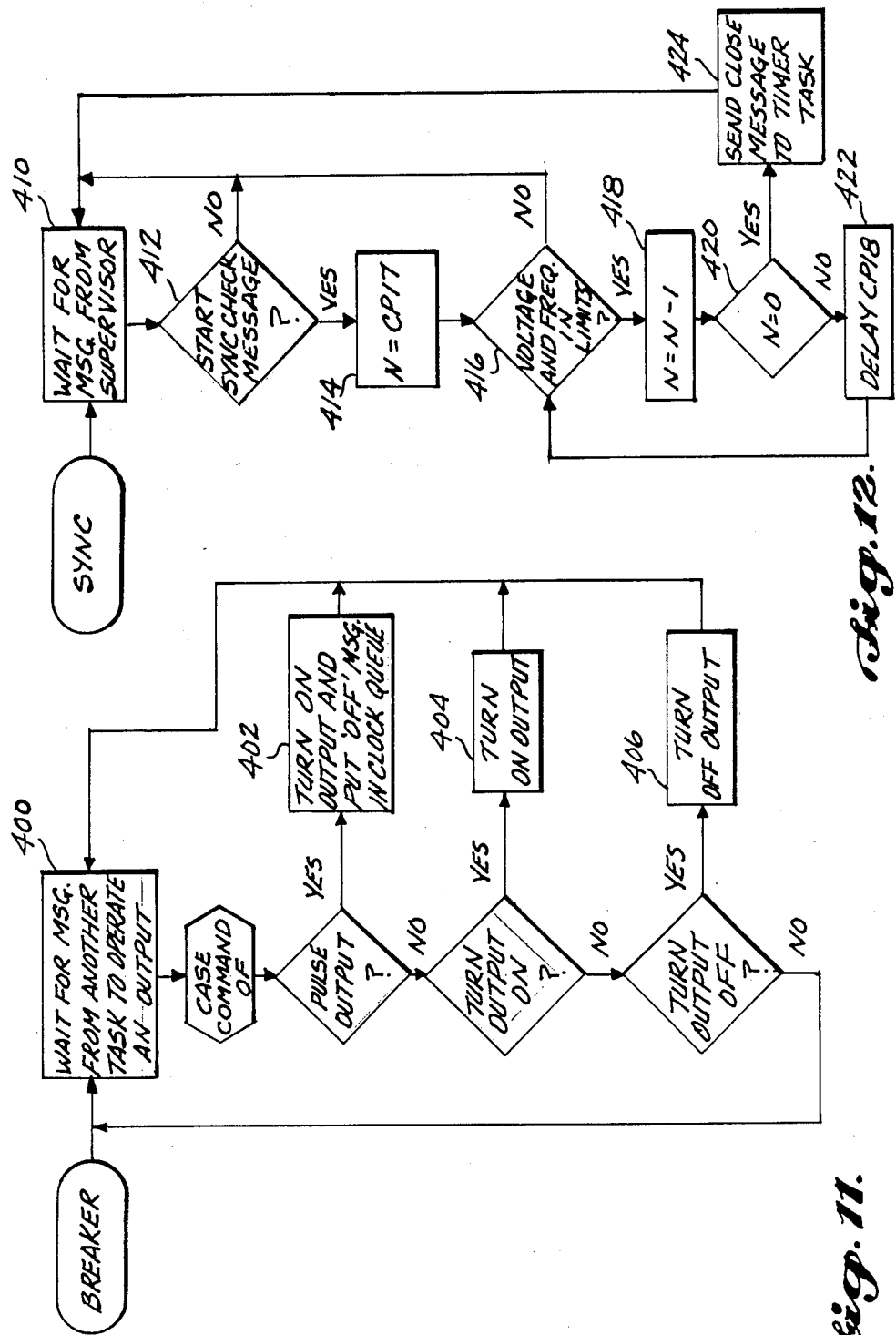

FIGS. 11-16 provide flow charts of the BREAKER, SYNC, GOVERNOR, VMATCH, REACTV and PROTECTION tasks that comprise the control module of the application software. Referring initially to FIG. 11, the BREAKER task remains inactive in block 400 until a message is received from another task. When a message is received, the message is decoded and block 402, 404 or 406 is executed. Block 402 is executed when the message calls for a pulse output. The message to the BREAKER task indicates the line that should be pulse (e.g. line 60, 62, 66 or 68) and the desired length of the pulse. Block 402, in response, energizes the appropriate relay, and puts an off message in the clock queue that will deactivate the output after the prescribed pulse length has expired. Control is then returned to block 400. If the message to BREAKER simply indicates that a given relay output is to be turned on or off (energized or de-energized), then block 404 or 406 performs the appropriate operation.

The SYNC task (FIG. 12) waits in block 410 for a message from the SUPERVISOR task. If the message is not a start sync check message, then block 412 returns to the wait state of block 410. If the start sync check message has been received, then block 414 sets N equal to parameter CP17 that specifies the number of times that the voltage and frequency must be found to be within their configurable limits specified CP19 and CP20. The SYNC task then enters the loop commencing at block 416, this loop functioning to provide the N checks established in block 414. If either the voltage or frequency is found to be outside prescribed limits in any one of these checks, then block 416 returns to the wait state of 410 and the SYNC task therefore performs no action. If the voltage and frequency tests are satisfied N times, then block 420 causes execution of block 424 that sends a close message to the TIMER task. The response of the TIMER task to this message has already been described.

Figure 13:
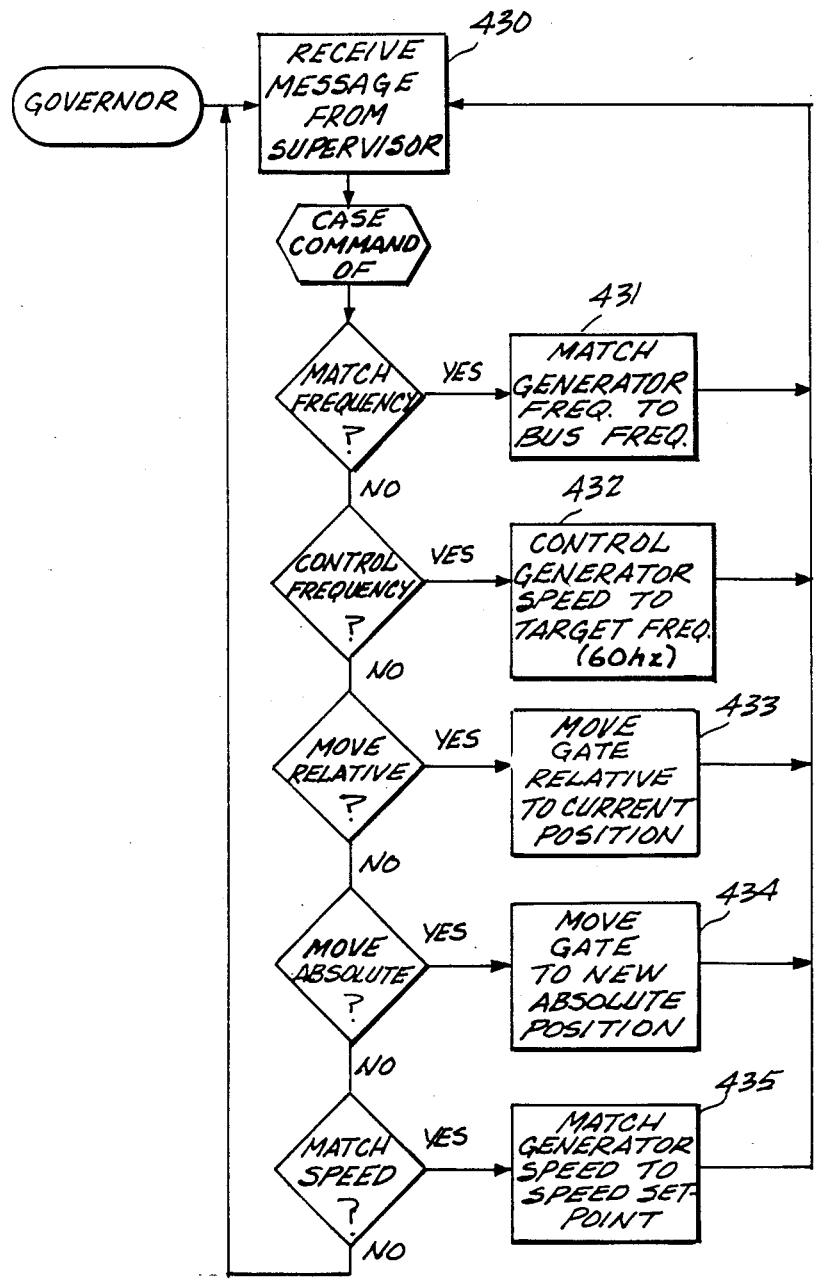

The GOVERNOR task is set forth in FIG. 13. In general, the GOVERNOR task is responsible for controlling PID controller 120 (FIG. 2). Like the other tasks in the control subsystem, the GOVERNOR task waits, in block 430, for a suitable start message, in this case from the SUPERVISOR task. When the message is received, the message is decoded, and as a result one of blocks 431-435 is executed. A match frequency message causes block 431 to match the generator frequency to the bus frequency. A control frequency message causes block 432 to control the generator speed to a target frequency (60 hertz). A move relative message causes gate movement for a prescribed amount relative to its current position. A move absolute message causes the gate to move to a new absolute position. Finally, a match speed message results in block 435 matching the generator speed to a speed setpoint.

Figure 14:
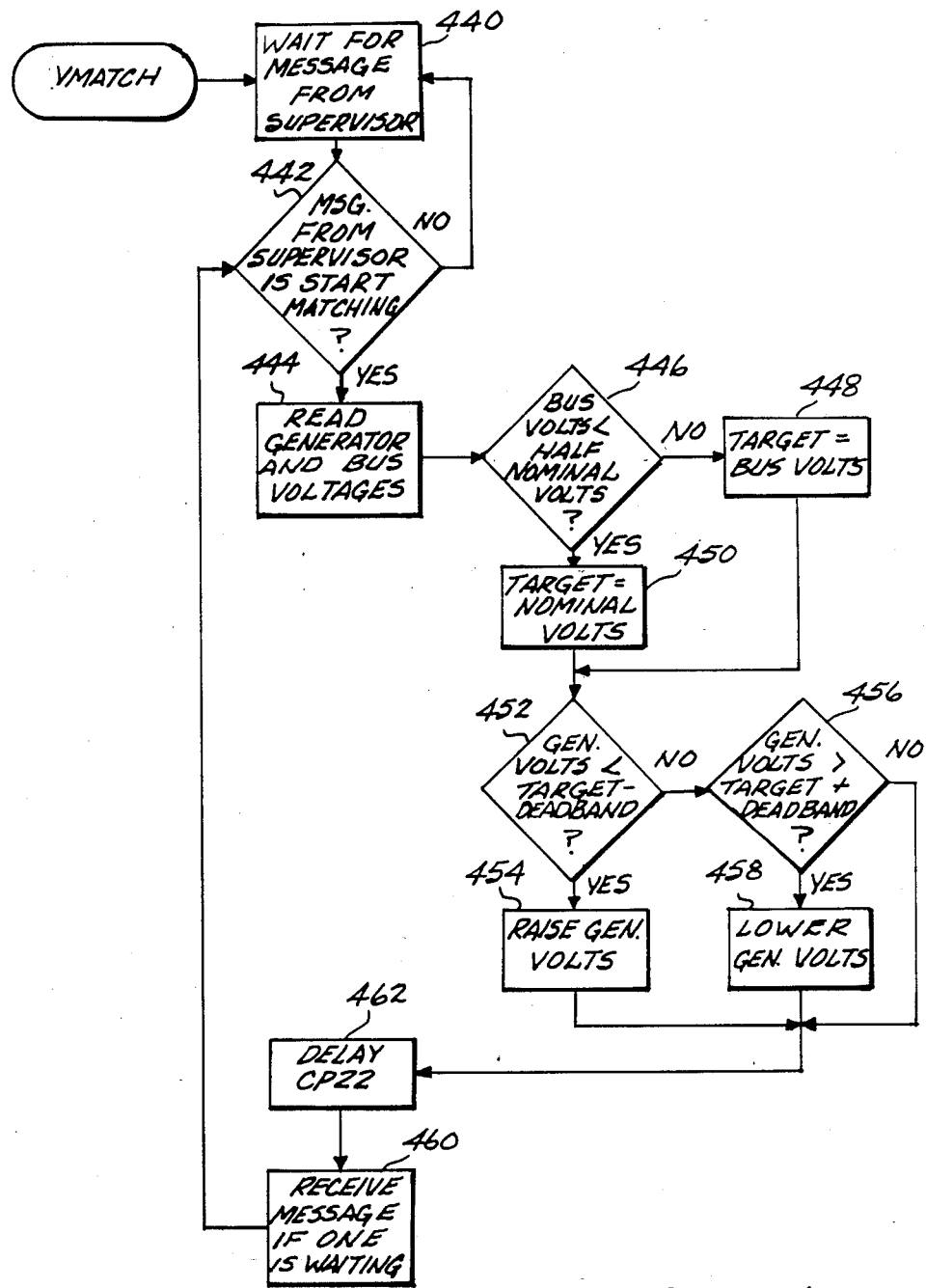

The VMATCH task in FIG. 14 waits in block 440 for a message from the SUPERVISOR, and block 442 determines whether such a message is a start matching method. If not, then the wait state of block 440 is reentered. If a start matching message has been received, the block 444 reads the generator and bus voltages, and block 446 determines whether the bus voltage is less than half of the nominal voltage. If it is not, then the target is set equal to the bus voltage, whereas if the bus voltage is less than half the nominal voltage, the target voltage is set equal to the nominal voltage. Block 452 then determines whether the generator voltage is less than the difference between the target voltage and deadband specified by CP21. If so, then block 454 raises the generator voltage setpoint by a prescribed amount. This is accomplished by sending a message to the BREAKER task indicating that a RAISE pulse of length CP10 should be produced on line 66. If the generator voltage is not less than the difference between the target and deadband voltages, then block 456 checks to determine whether the generator voltage is greater than the sum of the target and deadband voltage. If so, then block 458 lowers the generator voltage by sending a message to the BREAKER task indicating that a LOWER pulse of length CP10 should be produced on line 68. In any of these three cases, block 460 then causes a predetermined delay of CP22, whereupon block 462 determines whether or not a new message is waiting. Program flow then returns to block 442.

Figure 15:
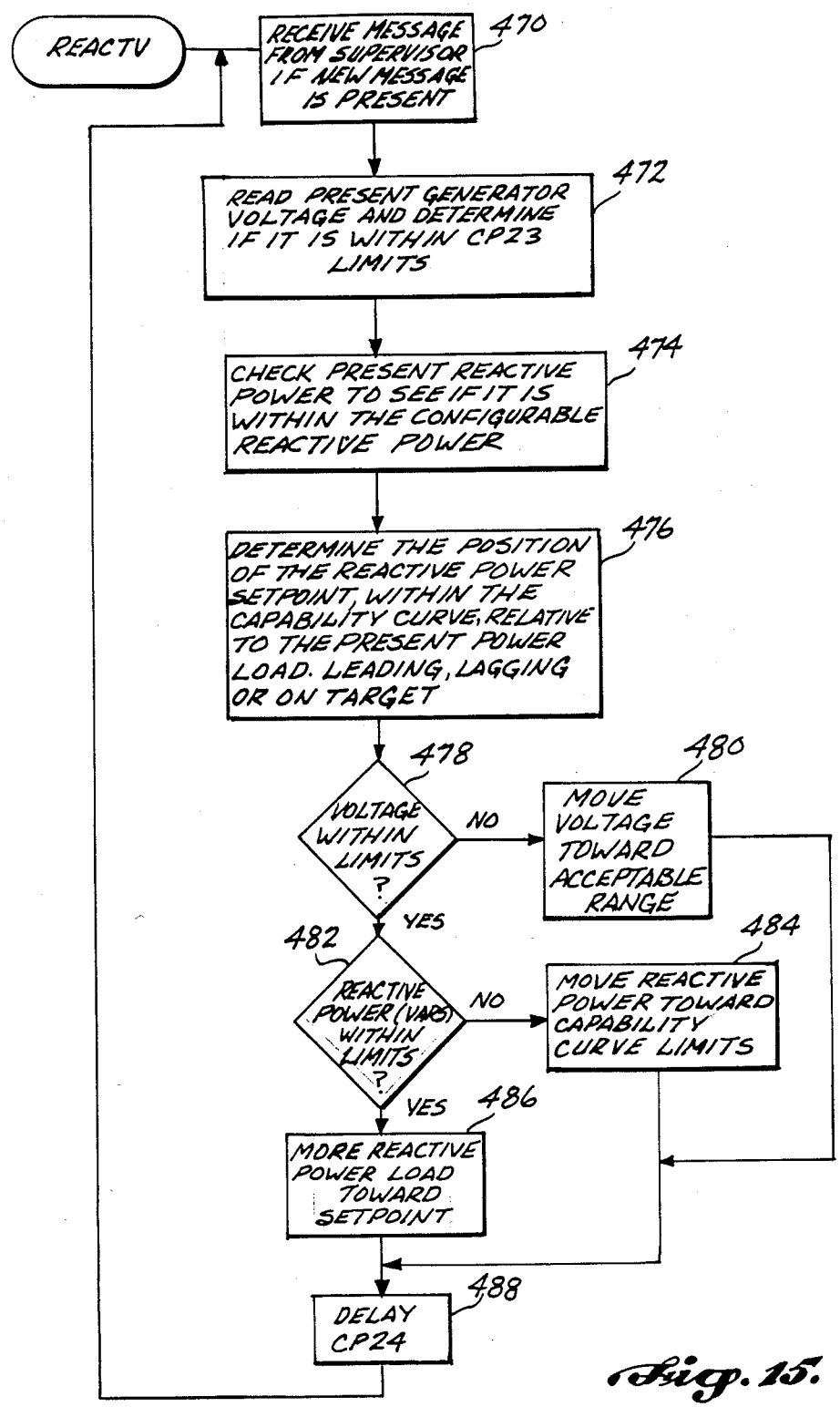

The REACTV task is shown in FIG. 15. This task waits in block 470 for a message from the supervisor task. When such a message is received, block 472 determines whether the present generator voltage is within the limit specified by CP23. Block 474 then checks the present reactive power value to determine whether or not it is within the reactive power capability curve for generator 12. This curve may be specified by a plurality of configuration parameters (not illustrated in Table 1), to provide the plant operator with essentially complete control over the check performed in block 474. Block 476 then determines the position of the reactive power setpoint within the capability curve, relative to the present reactive power loaded, i.e., this block determines whether the present reactive power loading is leading, lagging or on target. Block 478 then determines whether the generator voltage determined in block 472 is within configurable limits. If not, then the voltage is moved toward the acceptable range in block 480. If the voltage is within the limits, then block 482 determines whether the reactive power is within limits. If not, then block 484 moves the reactive power toward the limits specified by the capability curve. If the reactive power is within limits, then block 486 moves the reactive power load toward the setpoint. In any of these cases, block 488 then generates a delay specified by CP24, the the REACTV task reenters the wait state specified in block 470.

Figure 16:
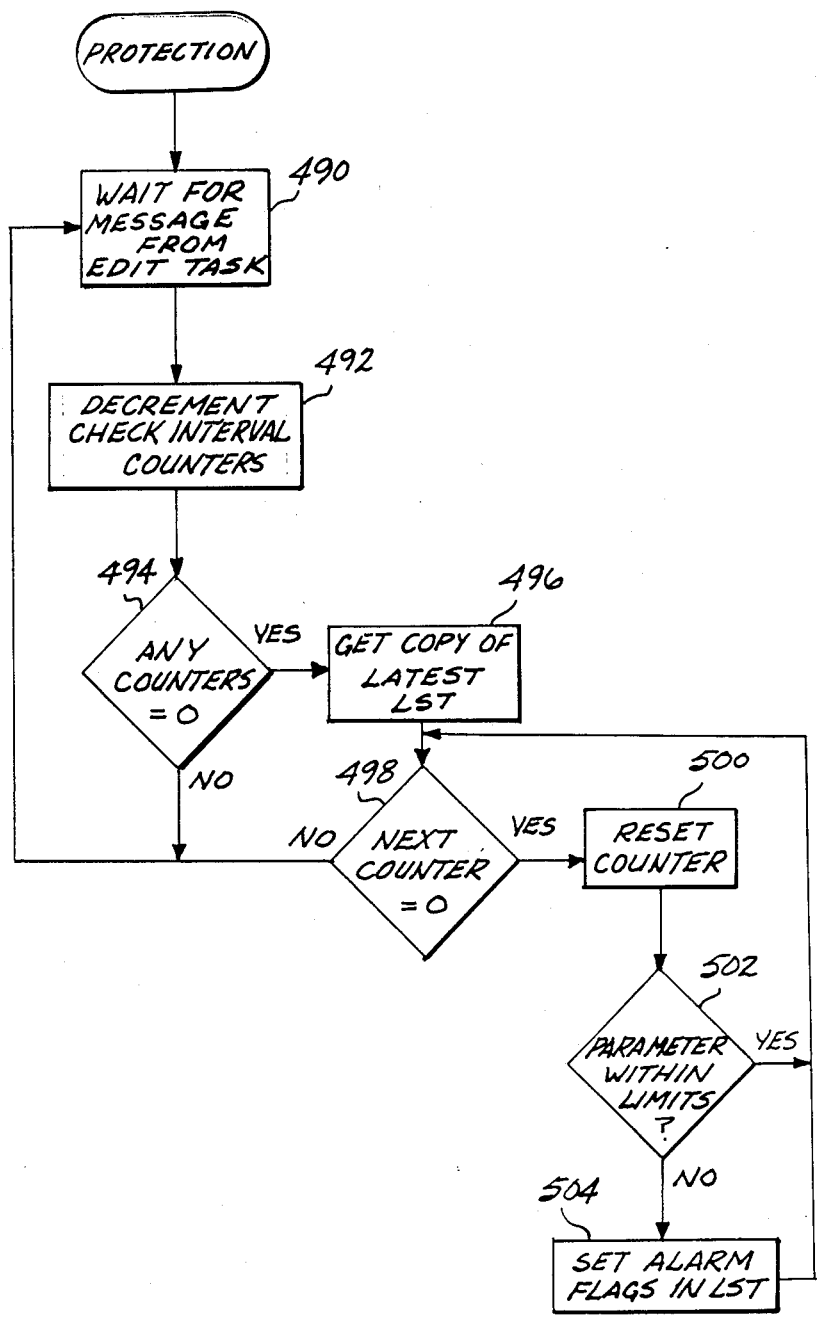

The PROTECTION task is shown in FIG. 16. The purpose of this task is to protect the generator and/or the line (i.e. the power grid) should an abnormal condition occur. The PROTECTION task preferably provides a number of monitoring and protection functions. Each function has an associated check interval and one or more limits. The check interval specifies the frequency at which the given function should be monitored.

The PROTECTION task waits in block 490 for a message from the EDIT task. In a preferred embodiment, such a message is sent every one sixtieth of a second. Block 492 then decrements check interval counters for the parameters to be monitored by the PROTECTION task. Referring to Table I, configuration parameters CP30-CP39 illustrate the parameters required for the PROTECTION task to monitor 4 variables—bus frequency, bus voltage, voltage balance and phase sequence. Parameters CP30, CP33, CP36 and CP38 illustrate that the four check interval counters are initialized to 60, 15, 60 and 60 respectively. Each of these counters is decremented in block 492. Block 494 then checks to determine whether any counter has reached zero. If so, then block 496 obtains a copy of the latest LST, and the PROTECTION task then enters a loop comprising blocks 498, 500 and 502. In this loop, for each check interval counter that has reached zero, block 500 resets the counter, and block 502 checks to determine whether the relevant parameter is within limits. For example for the bus frequency, the current bus frequency in the LST is compared to CP31 and CP32. Should any parameter be outside its prescribed limits, then block 504 sets the appropriate alarm flags in the LST. When the checks have been completed, the PROTECTION task returns to the wait state of block 490. The configuration parameters shown in Table I for the PROTECTION task are exemplary only in nature, and many additional checks could readily be performed. For example, checks similar to those shown by CP30-CP39 could be performed for generator voltage and bus and generator current. Checks could also be provided for monitoring parameters that are a function of both voltage and current, such as real and reactive power.

There are preferably a number of additional task not illustrated in FIGS. 5-15. These may include a power calculation task that computers a power factor, kilowatts (KW), kilovolt amperes reactive (KVAR), for example using the two watt meter method with phase B common or the three watt meter method with neutral common. Associated with this task are configuration parameters for specifying the repetition rate of the task, and the type of transformer. Also not expressly illustrated in the Figures are the details by which the governor task computes inputs to PID controller 120. Such inputs may be based on a number o configurable parameters, such as the number of seconds before the first correction, the number of seconds between corrections, a target slip frequency, proportional gains, integral gains and derivative gains for synchronizing. An accumulator task is also preferably provided for providing an interface between pulsed output kilowatt hour metering and the display on console 34. For example, a configurable parameter may specify that each pulse received represents a certain number of kilowatt hours.

TABLE I

| PARAMETER | TASK(S) | DEFAULT | DESCRIPTION |
| --- | --- | --- | --- |
| CP1 | SUPERVISOR | 1 | How fast the deflector is to be moved into the stream in an emergency stop-number of seconds for deflector to move from its position at the time of breaker trip to the CP2 position. |
| CP2 | SUPERVISOR | 99 | The position that the deflector will move to upon an emergency stop. |
| CP3 | SUPERVISOR | 1 | How fast the deflector is to be moved into the stream in the event of a normal stop-number of seconds for deflector to move from its position at the time the shutdown to the CP4 position. |
| CP4 | SUPERVISOR | 99 | The position that the deflector will move to upon a normal stop. |
| CP5 | SUPERVISOR | 60 | The normal frequency to be used during isolated operation. |
| CP6 | SUPERVISOR | 30 | Length of pulse to start relay in sixtieths of a second. |
| CP7 | SUPERVISOR | 30 | Length of pulse to stop relay in sixtieths of a second. |
| CP8 | SUPERVISOR | Y | Whether breaker is to be closed during isolated operation (Y or N). |
| CP9 | SUPERVISOR | 30 | Pulse width in sixtieths of a second for the TRIP or CLOSE pulses to main circuit breaker. |
| CP10 | SUPERVISOR | 15 | Width for the RAISE and LOWER pulses to the voltage regulator in sixtieths of a second. The smaller the pulse width, the finer control over the regulator. There is a corresponding loss of overall speed when using very small pulse widths. |
| CP11 | SUPERVISOR | 150 | Stator high temperature shutdown setpoint. |
| CP12 | SUPERVISOR | Y | Trip breaker on low power setpoint (Y or N). |
| CP13 | SUPERVISOR | 1000 | Low power setpoint for tripping main circuit breaker (KW). |
| CP14 | TRANS | 60 | Time in sixtieths of a second between successive readings of analog inputs. |
| CP15 | TIMER | 60 | Delay in sixtieths of a second for the |

TABLE I-continued

| PARA-METER | TASK(S) | DEFAULT | DESCRIPTION |
|---|---|---|---|
| | | | timer task. |
| CP16 | TEMPERATURE | 60 | Delay in sixtieths of a second for temperature task. |
| CP17 | SYNC | 5 | Number of times that voltage and frequency must be inside limits for synchronization. |
| CP18 | SYNC | 60 | Delay between successive CP17 checks. |
| CP19 | SYNC | 6 | Allowable voltage deviation from 120 nominal volts. This value should always be greater than the corresponding value in the voltage matching task. |
| CP20 | SYNC | 2 | Allowable frequency deviation. |
| CP21 | VMATCH | 0.15 | Voltage deadband for VMATCH task. This value should always be equal or preferably lower than a similar value in the SYNC task. |
| CP22 | VMATCH | 2 | Time in seconds between VMATCH task adjustments. |
| CP23 | REACTV | 6 | Allowable voltage deviation from 120 volts. |
| CP24 | REACTV | 3 | Delay for REACTV task in seconds. |
| CP25 | REACTV | 1 | Deadband for voltage control checking. |
| CP26 | REACTV | 1 | Maximum KVARS at a lagging power factor when real power is at zero. |
| CP27 | REACTV | 1750 | Real KW at the point where the lagging limit is most limited by the effects of stator heating. |
| CP28 | REACTV | 1 | KVA limit due to stator heating. |
| CP29 | REACTV | 1 | Real KW at the point where the leading limit is most limited by the effects of stator heating. |
| CP30 | PROTECTION | 60 | Interval between bus frequency checks, in sixtieths of a second. |
| CP31 | PROTECTION | 2 | Bus over-frequency trip limit in Hz. |
| CP32 | PROTECTION | 2 | Bus under-frequency trip limit in Hz. |
| CP33 | PROTECTION | 15 | Interval between bus voltage checks, in sixtieths of a second. |
| CP34 | PROTECTION | 129 | Bus over voltage trip limit in Volts. |
| CP35 | PROTECTION | 111 | Bus under voltage trip limit in Volts. |
| CP36 | PROTECTION | 60 | Interval between voltage balance checks in sixtieths of a second. |
| CP37 | PROTECTION | 10 | Voltage imbalance trip limit in Volts. |
| CP38 | PROTECTION | 60 | Interval between phase sequence checks in sixtieths of a second. |
| CP39 | PROTECTION | 30 | Phase sequence trip limit in degrees. |

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or priviledge is claimed are defined as follows:

1. A control system for a power plant, the power plant comprising a generator including means for producing a generator field, a turbine for converting the flow of a fluid into mechanical power to drive the generator, a control means for regulating the flow of said fluid, a voltage regulator for controlling the generator field to thereby control the voltage produced by the generator, a bus, and a main circuit breaker for selectively connecting the generator to the bus, the control system comprising:

nonvolatile memory means for storing configuration data comprising a plurality of configuration parameters for the power plant;

input means for producing input data including data indicating a speed of the turbine, a position of the control means, a current and a voltage produced by the generator, a current and a voltage on the but, and a position of the main circuit breaker;

multitasking processing means for processing said input data in accordance with the configuration data, to thereby produce control signals including breaker signals for tripping and closing the main circuit breaker, voltage level signals for establishing a voltage setpoint for the voltage regulator, and a control signal for controlling the position of the control means; and, edit means for enabling an operator to edit the configuration data, to thereby configure the control system for a particular power plant.

2. The control system of claim 1, wherein the edit means comprises a communication port, means responsive to a download signal for transferring the configuration data from the novolatile memory means to an external device through the communication port, and means responsive to an unload signal for receiving edited configuration data from the external device via the communication port and storing the edited communication data in the nonvolatile memory means.

* * * * *